(12) United States Patent
Labala

(10) Patent No.: US 7,065,954 B2
(45) Date of Patent: Jun. 27, 2006

(54) TURBINE, PARTICULARLY USEFUL FOR SMALL AIRCRAFT

(76) Inventor: Gustavo Francisco Labala, Sixto Fernández 1005, B1832JGS, Lomas de Zamora Buenos Aires (AR)

( * ) Notice: Subject to any disclaimer, the term of this patent is extended or adjusted under 35 U.S.C. 154(b) by 0 days.

(21) Appl. No.: 10/827,943

(22) Filed: Apr. 20, 2004

(65) Prior Publication Data
US 2006/0107647 A1 May 25, 2006

(51) Int. Cl.
F02C 3/22 (2006.01)
F02C 7/06 (2006.01)
F16D 3/06 (2006.01)
F02G 1/055 (2006.01)
F01M 1/00 (2006.01)
F01M 25/18 (2006.01)
F04D 27/00 (2006.01)
F02C 1/00 (2006.01)
F04D 29/08 (2006.01)

(52) U.S. Cl. .................. 60/39.465; 60/737; 60/39.512; 60/39.08; 184/11.2; 184/6.11; 184/6.12; 184/6.26; 415/16; 415/112

(58) Field of Classification Search ............ 60/39.465, 60/39.08, 39.512, 39.45, 39.52, 733, 804, 60/39.163, 737, 39.36; 184/6.12, 6.11, 6.26, 184/11.2; 415/16, 112
See application file for complete search history.

(56) References Cited

U.S. PATENT DOCUMENTS 2,934,168 A * 4/1960 Klompas .................. 184/6.26
3,313,104 A * 4/1967 Evans et al. .............. 60/39.163
3,637,049 A * 1/1972 Butterfield et al. ........ 184/6.12
3,851,466 A * 12/1974 Verdouw ...................... 60/737
3,964,254 A * 6/1976 St. John ..................... 60/39.52
4,040,249 A * 8/1977 Kahle et al. .............. 60/39.512
4,058,977 A * 11/1977 Markowski et al. .......... 60/733
4,177,638 A * 12/1979 Wood ....................... 60/39.512
4,211,070 A * 7/1980 Portmann .................. 60/39.08
4,265,334 A * 5/1981 Benhase, Jr. ............... 184/6.11
4,930,601 A * 6/1990 Leidecker et al. .......... 184/6.12
5,088,890 A * 2/1992 Jewess ....................... 415/112
5,140,808 A * 8/1992 Shekleton et al. ............ 60/804
5,234,315 A * 8/1993 Ogihara et al. ............... 415/16
5,247,855 A * 9/1993 Alten et al. ................. 60/39.45
5,765,363 A * 6/1998 Mowill ........................ 60/737
6,580,189 B1 * 6/2003 Mooney .................... 184/11.2
6,871,488 B1 * 3/2005 Oskooei et al. .......... 60/39.465

FOREIGN PATENT DOCUMENTS

JP 2000074081 A * 3/2000
JP 2004324863 A * 11/2004

* cited by examiner

Primary Examiner—Thai-Ba Trieu
(74) Attorney, Agent, or Firm—Notaro & Michalos PC

(57) ABSTRACT

A turbine includes a combustion chamber with deflectors generating vortices in a secondary gas flow into the combustion chamber, thereby confining the flame front from penetrating into the cold region of the chamber under variable operating conditions, simplifying cooling of the chamber walls. The turbine further includes devices for decoupling vibrations between the high- and low-speed shafts, including a loosely mounted spline coupling the high-speed shaft to the step-down system and disk dampening means coupling the step-down system to the low-speed output shaft.

17 Claims, 5 Drawing Sheets

TURBINE, PARTICULARLY USEFUL FOR SMALL AIRCRAFT

FIELD OF THE INVENTION

The present invention is related to a compact, lightweight, efficient and durable turbo-engine able to deliver power to a shaft as well as thrust from the reaction of the exhaust gases and heat. One practical application of the present turbo-engine is for generating electricity. Another application is an engine for propeller-driven aircrafts whether airplanes or helicopters, in marine uses for driving an underwater propeller, or any other application requiring delivery of power to a rotary shaft, whereby the balance of energy of the exhaust gases may be used for cogeneration or directly as heat.

BACKGROUND OF THE INVENTION

To be cost efficient, terrestrial electrical generators under 1,000 HP use reciprocating engines as their power source. Reciprocating engines use up a lot of closed space which has to be adapted to tolerate heavy weights and medium- and low-frequency vibrations, high maintenance costs and a narrow range of fuels. Furthermore, these engines take a long time to warm up and get into condition for connecting to the power lines, which hinders its ready availability to respond to demand or else high maintenance costs when it is stopped for servicing to be performed while still hot to reduce the outage time.

Light airplanes and helicopters needing power plants under 500 HP use internal-combustion engines. Compared to turbo-engines, these engines are heavier per unit of delivered power, highly complex because of the large quantity of moving parts they contain and require periodic specialized inspections.

Light one-to-four seating helicopters are particularly penalized because there is no alternative for them other than combustion engines. Therefore, their capabilities are severely restricted by the need to carry a heavy power plant, a significant weight in terms of one or several passengers. Stresses and vibrations transmitted to the whole helicopter and to the passengers or the use of reciprocating engines further significant deter use of these helicopters.

The high market prices of both light airplanes and helicopters have made room for the use of turbines instead of combustion engines. A difference compared to the combustion engines, wherein the different strokes of the ignition cycle are carried out reciprocating in cylinders (in pulses), is that turbines carry out their ignition-compression process continuously. The turbines comprise a compression stage for producing pressurized air, a combustion chamber into which the pressurized air is admitted together with fuel and an expansion stage producing power on a rotary shaft by means of a turbine integrated to the compressor. Part of the power generated by the turbine is used for driving the compressor and the auxiliary systems, the balance is available as net power.

A feature of turbines is their ability to generate a high density of mechanical energy per volume-unit compared to combustion engines of the same power. On the other hand, in turbo-engines, dynamic high-amplitude and low-frequency stresses are transmitted to the structures since they lack massive oscillating or eccentric mechanisms.

A further competitive advantage of turbo-engines vis-avis combustion engines is the former's greater flexibility in the election of fuel. Combustion engines only use aircraft petrol which is very volatile and explosive, with the safety considerations this implies. On the other hand, turbo-engines may be fuelled with aircraft kerosene (JP1), much less volatile and explosive, natural gas, diesel-oil or practically any kind of fossil or synthetic fuel producing a lower emission of polluting gases compared to combustion engines of like power. This makes the turbo-engines more attractive for terrestrial or stationary uses, given the possibility of using cheap fuel for the generation of electricity or delivering work to a shaft. In addition, the balance of heat which is emitted as well as the high-temperature exhaust gases may be advantageously used, either for supplying a heating system or for recovery in a secondary cycle, leading to improved efficiency of the turbo-engine cycle. Furthermore, turbo-engines are less sensitive than combustion engines to loss of atmospheric pressure and low temperatures, as occurring at high flight altitudes.

Aircraft turbines are well established for the high power segment, say above 600 HP.

An important technical obstacle that must be overcome when designing a low-power turbo-engine turning at high speeds (over 25,000 RPM) is that its applications generally require a substantially lower number of revolutions per minute (RPM), meaning that an associated gear-box is necessary but which otherwise would be undesirable in that it adds weight, mechanical complexity and auxiliary systems.

BRIEF REVIEW OF THE PRIOR ART

As schematically shown in FIGS. 1 and 2, my Argentine patent application serial number P010105645 discloses a compact turbo-engine comprising an air compression stage 1, an annular combustion chamber 2 including a cold region 3 and a hot region 4 with flame conduction by means of air jets 5 between the cold and hot regions and an electrical redundant fuel injection system 6 counter-flow injecting fuel into the combustion chamber, a stage 7 for extracting work and expansion, a high-speed cantilever shaft 8 with which the compression and expansion stages are integrated, supported by a pair of bearings 9 located in the "cold" side, lubricated by means of oil distributed through the hollow inside of the shaft 8 and orifices in its wall 10. The work-output shaft speed shift-down system is coupled to this end by means of a gear 11. This gear is integrated to a hollow spline 12 housed within a cavity inside the high-speed shaft 8 and coupled thereto by means of fluting 13. Oil is fed back to a reservoir by means of an outer jacket 14 that surrounds and retains the bearings 9 and the use of a blower 15. The lubrication of the gear turning at high speeds is carried out through orifices in the base of the gear cogs, centrifugal force driving the oil out from the central cavity of the gear.

One of the greater technical problems in designing an efficient, low-power turbine is related to the fact that, due to physical operational principles, a reduction in the flow capacity and size thereof leads to having to increase the rotation speed of the compressor-turbine assembly, thereby significantly increasing mechanical stress on the moving parts materials. This conditions the life-term of the components and is in part associated with the wear of the moving parts.

The main causes of wear tend to be inadequate lubrication of the bearings turning at high speed, gear alignment tolerances and imbalance, stress resulting from thermal expansion of materials and transmission of vibrations between the high-speed shaft, the step-down gears and the output shaft delivering useful work, be it in electrical generators, propellers, water pumps, compressors et cetera.

Lubrication is critical for achieving high turning speeds on ball- or roller-bearings, fundamentally because of the impossibility of injecting the lubricant. Relatively simple air or gas bearings may be reliably used in very low power applications (tens of HP). The usefulness of this solution is nearly exclusively limited to lightweight shafts turning at very high speeds. These weight and speed limitations restrict the power range. Magnetic bearings are extremely expensive and complex and, hence, not cost-effective in turbo machines of powers under 1,000 HP.

In order to achieve a low-maintenance turbine, the problems leading to wear in the moving parts need to be addressed since they shorten the useful lifespan of the mechanical parts and increase the frequency of having to change the oil and filters.

Friction between the moving parts of the bearings leads to less efficiency since mechanical energy is converted into heat, leading to heating of the oil. This poses an additional requirement of having to provide means (radiators) for removing heat and distribution ducts for the oil systems, thereby increasing the quantity of components and complexity, in detriment of overall weight and compactness.

Devices exist for directing the injection of oil into the cavities of the bearings by means of high-speed jets. However, they are scarcely efficient at wetting the roller paths due to the impact and dispersion of the oil jets against the balls moving at speeds, as a result of the substantial speed difference between the jets and the balls. Although this system lessens the impact of the abovementioned effects, it fails to solve the drawbacks conditioning the useful lifespan of the bearings.

The need for a big reduction in the speed of turbines of powers under 600 HP for applications such as low-speed turbo-shafts implies the addition of a gearbox. Alignment and tolerances between the step-down gears and the transmission of vibrations from the low-speed shaft back to the high-speed shaft condition the durability of its components, in particular the bearings.

It is also necessary to be able to easily assemble and remove said devices and that they have the necessary degree of freedom to accommodate thermal expansion.

The step-down gearbox and the turbine high-speed shaft 8 are heretofore coupled by means of a hollow spline 12 affixed to a gear 11. The high-speed gear must be mounted in the shift-down gear maintaining very strict tolerances on special benches to guarantee proper alignment and a certain overall useful lifespan. Maintenance work must therefore be carried out in specific installations to which the turbo-engine has to be taken.

Some current designs use an orbital-type gear as the shift-down gear, comprising an axially arranged shaft and three gears. One of the main drawbacks of this arrangement is the transmission of vibrations towards the high-speed shaft, which is detrimental to the useful lifespan of the bearings and is exacerbated by the interaction of more than one torque transmission point.

Another factor limiting the lifespan of the turbine is the maximum temperature to which the region at the edge of the turbine rotor vane 7 is subjected, this being the part most prone to stresses and temperatures. In particular, the flame front has to be confined to the hot region 4 of the combustion chamber, to avoid thermomechanical stresses on the rotor of the turbine generated by the flame in operation and during load transients.

The problem of confining the flame front to the hot region furthermore causes emission of contaminants as a product of incomplete combustion and problems of sudden flame quenching during acceleration and deceleration transients.

Another feature of conventional turbo-engine designs is the use of annular, countercurrentwise flow combustion chambers. These designs use a so-called primary percentage of the air coming from the compressor for the combustion in the interior region and another, so-called secondary, part of the air which is useful for diluting and cooling.

Several attempts have been made to confine the combustion primary in an annular chamber, beginning with the formation of vortices during injection of the secondary flow. This is achieved by means of orifices 5 which communicate the peripheral region 3 of the intake of cold air coming from the compressor with the central region 4 corresponding to the combustion chamber in a region usually known as "region of the secondary". To assist mixing and cooling of the wall, blades are located on the inner face of the wall separating the intake region from the combustion chamber to promote turbulence and vortices.

The location of the flame front inside the combustion chamber is strongly dependent on the location and intensity of the vortices so that the flame front shifts under varying operation conditions to the extent that it may reach the rotor under certain dynamic situations. An attempt to avoid this uses a flame arrester in the primary, up-current from the turbine 7 intake, with the consequential addition of a device that requires high-temperature resistant materials, meaning more parts and loss of pressure, adversely affecting weight, simplicity, durability and efficiency of the turbo-engine.

Another feature of conventional turbo-engine models is the use of RPM sensors for controlling the start-up sequence. The sequence consists in supplying energy to the starter system and, once a predetermined turning speed has been reached, the intake of fuel to the ignition injector is opened and the sparking plug enabled. The turbo machine increases its rotation speed even more until it surpasses the idling limit, after which the sparking plug is disabled and the supply of fuel to the running injectors is enabled. The use of a turning speed sensor (proximity, optical or magnetic, inter alia), implies an additional electronic component, assembly tolerances and strict maintenance check-ups in view of that the start-up sequence is of critical importance.

Another feature of conventional turbo-engine designs is the insertion of the oil pump inside the gearbox, where it is difficult to access, or, as suggested in abovementioned prior art Argentine patent application P010105645, externally coupled to the low-speed shaft by means of gears. Hence a drawback is the need for an additional coupling gear, resulting in more parts, weight, difficult disassembling and detrimental to compactness and simplicity.

Another feature of conventional turbo-engine models is their use of several mechanical devices of considerable complexity, such as valves and throttles for controlling the injection of the fuel into the combustion chamber. These devices have to be adjusted with extreme precision because of the narrow tolerances they are built around and are intensely affected by variations of atmospheric conditions. Since these mechanisms are made up of a number of parts, it is considerably expensive and difficult to include redundant systems to improve the reliability thereof and of the entire engine turbine in general. Furthermore, the operation of these mechanisms involves a complex ignition and control procedure during which the different ignition stages have to be manually enabled and disabled, opening the door to a new range of potential faults arising from human operational errors.

The operation of the turbine may be automated by means of mechanical, electronic or hybrid systems. Although this reduces the probability of human error, yet more systems are added to the already extremely complex systems of the turbine per se, adding further penalties in terms of cost and weight and introducing new fault sequences.

Because the auxiliary systems of the turbo-engines are complex, the power consumed by the auxiliary systems of high-power turbo-engines is similar to that of the systems of small turbo-engines. This curtails the design and implementation of low-power turbo-engines, as upper limits in the power consumption of auxiliary systems come into play in order for the operation of the turbine at low-power cruising speeds be self-sustainable.

In prior art Argentine patent application serial number P010105645, the fuel is injected into the combustion chamber using two conventional electrical fuel pumps operating in parallel. Both fuel pumps are capable of delivering 100% of the required flow-rate, thereby providing redundancy. The small increment in the power consumption as a result of the redundant injector pumps is more than offset by the greater reliability of the system. Both pumps are automatically turned on when the ignition key selects the ignition mode by means of electric clamping relays. The clamping requires an oil pressure signal for enabling the pumps. The operation status of the pumps can be checked by the turbo-engine operator, for proper decision taking in case of malfunction of either pump. The electric power supply for the injector pumps and for the electric starter motor is obtained from a low-voltage, high-load capacity battery. A precision valve in series with the injection pumps regulates the flow of fuel into the combustion chamber, thereby controlling flow according to the pressure drop in the control valve. In order to regulate the fuel injection rate in the state of minimum power so that the reaction is self-sustainable (regulated speed), a shunt tube circuit of a capillary diameter hydraulically shorts the inlet and outlet of the injection control valve such that the injector pumps always receive a small flow of fuel, even if the control valves are completely shut. The system is thus less sensitive to the fuel injection rate at low speeds in relation to the position of the control valve, enhancing the power control precision of the turbo-engine.

This prior art has the drawback that the control valve has to be operated via servomechanisms or else by means of the usual control cables, adding more devices with their attendant fault and maintenance rates.

In conclusion, it can be said that the traditional aircraft turboshaft designs cannot be extrapolated down to the low-power range and still match the reliability, durability, efficiency and simplicity required in commercial aviation or avoid drawbacks in maintenance and wear for the generation of electricity or useful work on the ground. This is due to the complexity and technical problems that need to be overcome go up as the power and the size thereof go down. Proof of this is that available low-power turboshafts used for fixed or military installations are very complex, have limited lifespan, require a lot of maintenance and are pretty expensive considering the low power levels involved.

SUMMARY OF THE INVENTION

The turbo-engine design of the present invention retains some of the general aspects found in Argentine patent application serial number P010105645, but overcomes technical problems mentioned hereinabove by means of an overall arrangement that puts emphasis on simplicity and on a series of innovative systems. These include: an internal oil system, a power-regulated and starting control system, an advanced combustion chamber with flame front stability control and a gearbox coupling systems to the high-speed shaft, to the power output shaft and to the oil pump. These systems drastically reduce wear in the moving parts thereby improving efficiency of the turbo-engine and do away with the need of complex heat removal systems together with a decrease of mechanical stress on high-speed components subjected to load transients, without requiring additional components, increasing durability and reliability with minimum maintenance and reducing weight and the quantity of necessary parts.

The present invention consists of a compact turbo-engine providing better performance, greater durability and lower maintenance for delivering mechanical work on a shaft and thrust by means of exhaust gases and/or heat, with powers below 600 HP in its preferred embodiment. This turbo-engine comprises an air compression stage, an advanced annular combustion chamber providing flame conduction and flame front stability control by means of jets generating vortices in the cold region, a high-speed, cantilevered shaft to which the compression and expansion stages are integrated, supported by a pair of bearings placed in the "cold" side, wherein the high-speed bearings are lubricated by an efficient oil distribution and direction system, the compact gearbox using substantially planar gear-wheels, a starter control system, an electrical power-regulation and redundant electrical fuel injection system for power regulation and easily assembling systems between the gearbox and the compressor turbine subsystems by means of extractible splines conveying smooth transmission and reduced wear of the parts.

BRIEF DESCRIPTION OF THE DRAWINGS

The above-stated and other novel features and aspects of this invention and how it may be reduced to practice may be understood better from the following detailed description of a preferred embodiment shown in the attached drawings, wherein.

DETAILED DESCRIPTION OF PREFERRED EMBODIMENTS

Figure 1:
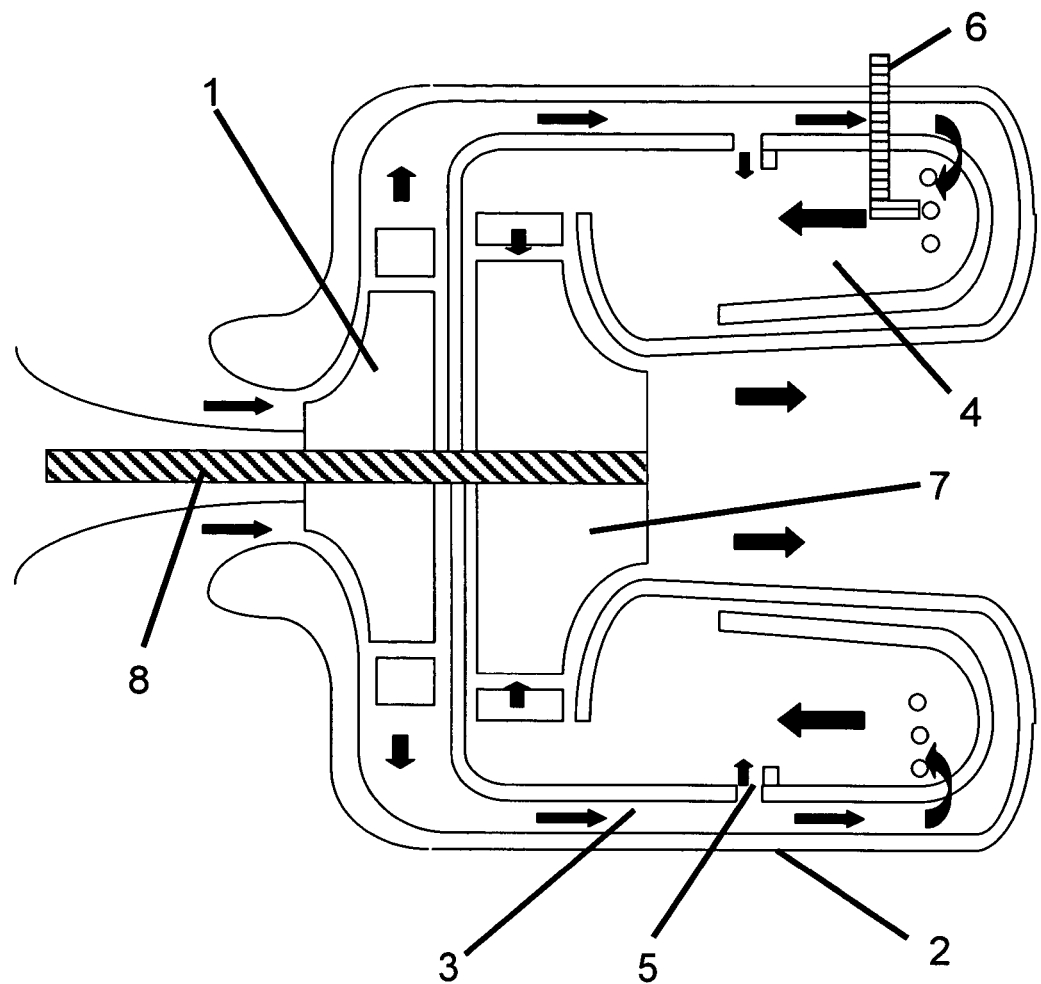
FIG. 1 is a schematic of a prior art compact turbo-engine having an annular combustion chamber and-showing the path followed by gases inside there.
Figure 2:
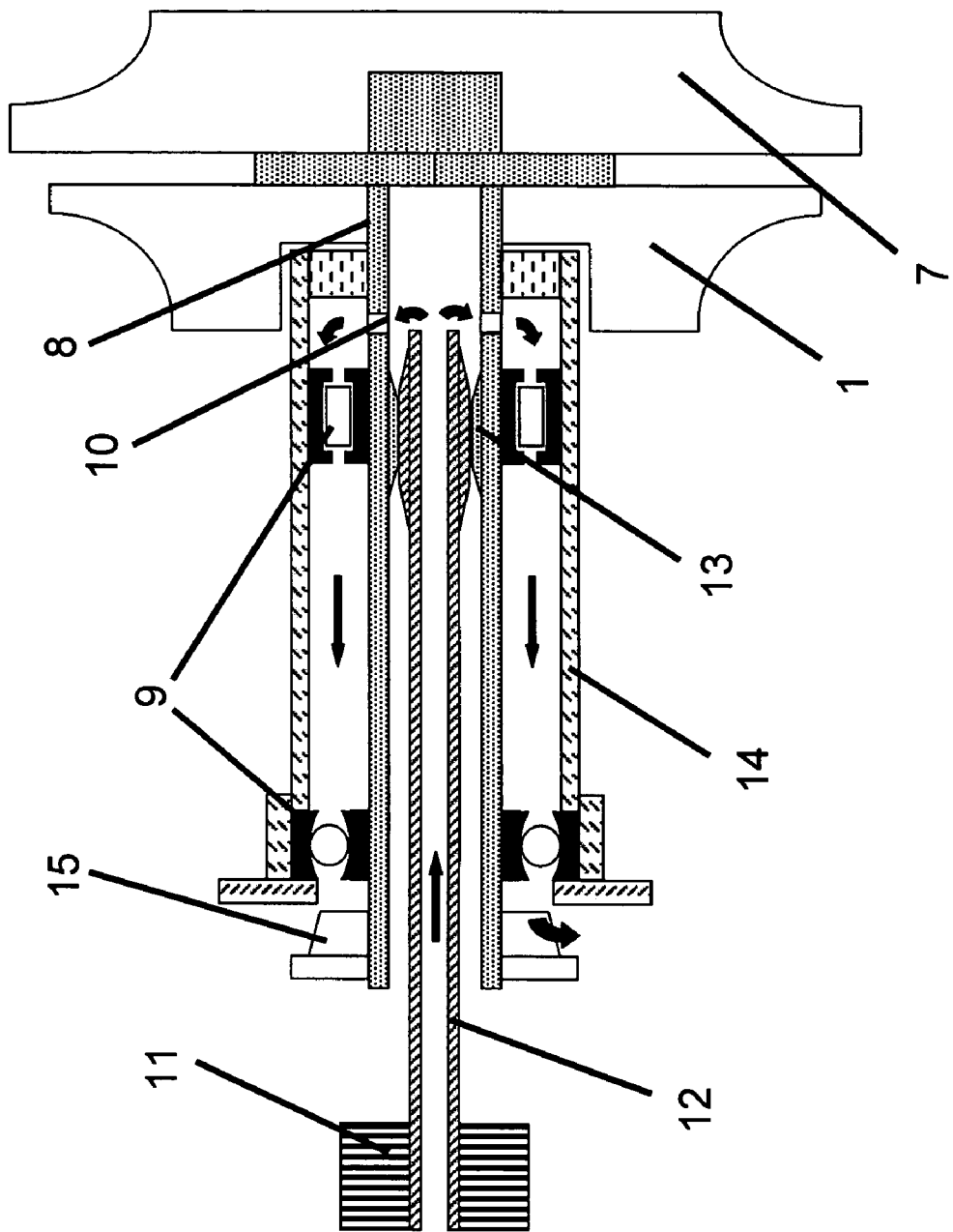
FIG. 2 is a schematic side-section view illustrating in detail a part of a prior art system for lubricating the bearings of the main cantilever shaft of FIG. 1 and the path the oil follows therein.
Figure 3:
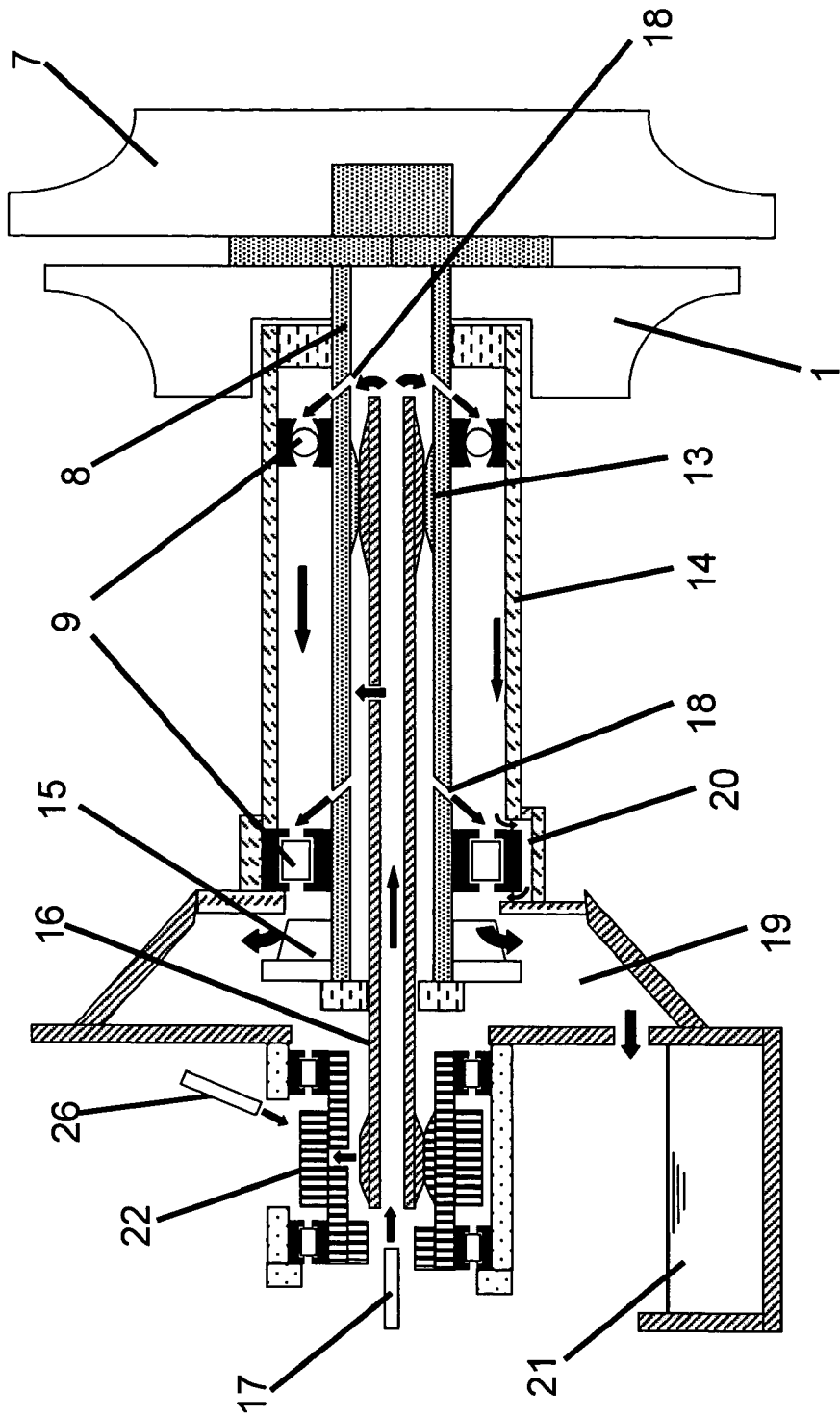
FIG. 3 is a schematic view of the high-speed bearing lubrication system showing the path followed by the oil therein and the mechanism for coupling the high-speed shaft of the compressor-turbine assembly to the shift-down gearbox.

I have found that the turbo-engine of the present invention is able to operate at speeds up to 70,000 RPM on the high-speed shaft, with an extended life-term of the high-speed shaft bearings by means of an oiling system such as schematically shown in FIG. 3. The physical arrangement of the annular combustion chamber, compressor and turbine together with the arrangement of a pair of bearings in the cold region of the cantilever compressor-turbine assembly allows the oil operation conditions on the bearings to be relaxed.

The engine is assembled with a hollow high-speed shaft 8 on one end of which the compressor 1 and the turbine 7 are mounted to be supported on a pair of bearings 9. The bearings 9 are externally anchored by means of a jacket 14 and house a removable hollow spline 16 inside. Oil 17 enters through one end of the spline and is injected through orifices 18 into the shaft 8 where it is directed towards the ball-roller-paths of the bearings.

The oil is urged outwards by effect of the centrifugal force of the shaft, to be injected towards the bearing balls with little or practically no dispersion since the relative speeds between the oil jets and the balls is thus small. There are at least six orifices 18 evenly distributed around the shaft circumference, each sub-millimeter in diameter and inclined at an angle such that the oil injection velocity approaches the orbiting speed of the bearing rollers (or balls). In this way, the oil effectively wets the roller paths of the bearings and friction between the balls and the paths is substantially reduced, consequentially reducing wear and heat of the contact zones to a minimum. Moreover, the temperature of the oil does not become excessive and contamination of the parts is prevented, warranting extended durability or useful lifespan of the mechanical parts and of the oil and filters.

The oil is aspired out of the bearings and driven towards a discharge chamber 19 by a blower 15. To facilitate good circulation of the lubricant coming from the bearing nearest the compressor 1, a passage channel 20 is provided over the jacket. The lubricant present in the discharge chamber 19 is drained towards a lower reservoir 21 of the step-down gearbox, where it cools by mixing with the residue oil stored therein. In view of that the oil is scarcely heated up when passing through the bearings at high speed using this lubrication system, no coolers are needed to keep the temperature from exceeding the range in which its properties are not degraded. Cooling of the oil stored in the lower reservoir of the gearbox is carried out by the surrounding environment and conduction through the outer housing of the step-down gearbox and external convection, assisted by the inflow of air under forced convection to the compressor. The volume of oil necessary in the reservoir 21 for keeping the temperature controlled is proportional to the cooling power.

All this contributes to a simple, small and lightweight system. Another by no means minor consequence for the turbo-engine is that friction is low and, therefore, very little mechanical energy is converted into heat and wasted so that machine efficiency is increased.

Mechanical power is output on the low-speed shaft by means of a compact gearbox coupled to the high-speed shaft of the turbo-engine. The step-down gearbox includes parallel planar or small-angle gearwheels which simplifies assembly and lubrication thereof. The speed step-down is carried out by means of an intermediate reduction gearwheel, a high-speed gearwheel 22 and a low-speed gearwheel 23. The starter-motor is coupled to the low-speed gearwheel 23 by another gearwheel and the external oil pump 25 is coupled to the power output shaft 24.

The high-speed gearwheel 22 is oiled through orifices passing through the base of the cogs thereof towards the central cavity, from where the oil flow is driven by centrifugal force from the center and by injection along a duct 26 coming from the discharge outlet of the pump of the oil circulation system.

In contradistinction to the prior art, the transmission of power from the high-speed shaft 8 of the turbine-compressor assembly to the high-speed gear 22 of the step-down gearbox, is carried out by means of a hollow removable spline 16. The high-speed gear is hollow and its central cavity is grooved for coupling with the spline. This spline provides easy assembly of both subsystems. The outstanding feature of this coupling is that the spline is loose and, hence, may compensate thermal expansion between both subsystems and, since it is also immersed in oil, decouples vibrations on both sides of the coupling, thereby lowering stress on the bearings. The oil film that is formed on the cog surfaces furthermore has the advantage of decoupling vibrations of the turbo-engine assembly from the step-down gearbox which are at considerably different frequencies and intensities. Very good gear alignment may be achieved to extend their lifespan. All these features reduce tolerance severity in the assembly of both subsystems and, therefore, may be used in installations which are less complex than current installations.

The lubrication system uses a positive-displacement external pump 25 which is mounted to the low-speed power output shaft 24 by means of a removable spline 27. This simplifies maintenance thereof since it is easy to dismantle the pump from the gearbox. The pump sucks in cooled oil through a duct from the reservoir, passing through a filter on the way, and distributes the oil towards the central cavity of the high-speed spline, through a duct 17 as described and towards the bearings of the power output shaft 24 through a central cavity 28 of the latter shaft and the gears by means of distribution ducts.

Figure 4A:
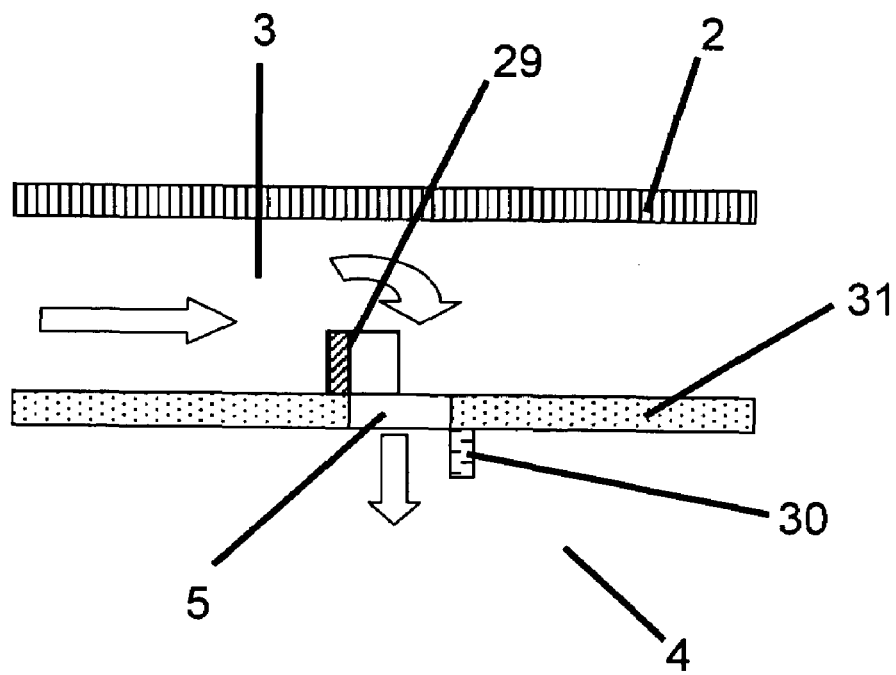
FIGS. 4A and 4B are respective cross-section and upper views showing the vortex generator means on the cold side of the combustion chamber, near to the orifices providing communication to the hot region in the secondary, and the path followed by gases.
Figure 4B:
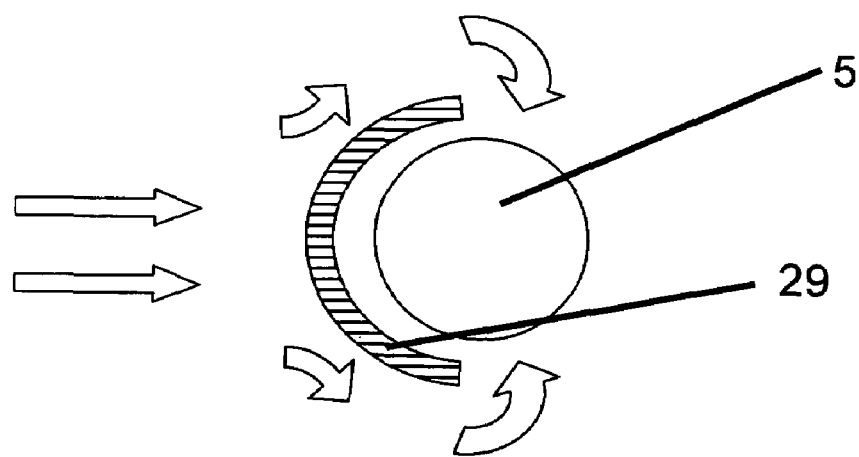

FIGS. 4A and 4B show the device 29 for generating vortices of the incoming secondary flow to the hot region 4 of the combustion chamber. As illustrated in FIG. 3, the combustion chamber 2 is of a compact, toroidal shape such that the distance traveled by the air inside the chamber is longer than the major axis of the chamber 2. Each vortex generator device comprises an approximately semicylindrical deflector member 29 which is located up-current from the conventional orifices 5 communicating with the hot region of the combustion chamber, following the gas flow direction towards the inlet region 3.

In one embodiment, each deflector member 29 is slightly taller than the diameter of orifice 5 (which can be e.g. 2 mm in a 10 HP miniturbine up to about 40 mm in a 1,000 HP turbine. The deflector members 29 are of the same material as the outer wall of the chamber to avoid thermocouple e.m.f. and are spot-welded thereto.

FIGS. 4A and 4B also illustrate how the gas must deflect to get around the obstruction presented by the members 29, promoting the formation of vortices in the flow through the orifices, known as the secondary flow in the combustion chamber. The intensity of the vortices depends on the flow-rate, so the greater the flow-rate the greater the effect. The prior art only provides for promoting mixing 30 on the face of the hot region.

The forward part of this hot combustion region is called the flame front. The purpose of injecting a cold flow into the hot region of the combustion chamber is to cool the confinement walls 31 of the hot region, guide the outlet flow from the hot region and furthermore reduce the temperature of the outlet gases, which are a product of the combustion, prior to entering into the work extraction zone 7. On the other hand, atmospheric contaminants produced by the combustion appear when the temperature of the combustion products is kept very high to produce association and disassociation of the molecules. By injecting the secondary flow into the hot region of the chamber, these effects are reduced, depending on the degree of mixing turbulence in this region.

By means of the above-described members 29, the flame front during normal running and during fast power transients is confined, thereby enabling a very good dynamic response to power variation, without the need of flame arresters to prevent the flame from reaching the more mechanically delicate region of the turbine or strongly limit the rates of acceleration and deceleration. Moreover, combustion is good and contaminant emission is low.

With a view of reducing the quantity of components and maintenance check-ups, the sensing of the rotation speed of the turboshaft for controlling the start-up sequence is carried out by measuring the oil pressure at the positive-displacement oil pump 25 outlet, this being a necessary component for the oil distribution. In this way, another function not known in the prior art is performed.

The pressure in this kind of pump is proportional to the rotation speed of its parts. Since the pump is directly coupled to the low-speed shaft 24 and via the step-down gearbox to the shaft 8 of the compressor turbine assembly, a calibrated bulb at a predetermined pressure, i.e. RPMs, may be used for controlling the start-up sequence. This system is moreover robust and resistant to vibrations, and dramatically reduces maintenance requirements and assembly tolerances of the complex turning-speed measurement systems like, e.g. proximity, magnetic or optic sensors or the like.

A particular feature of the compact turbo-engine is that the dynamic system comprising the turbine 7, the combustion chamber 2 and the compressor 1 exclusively depends on the injection of fuel into the combustion chamber and the load applied to the power output shaft 24, so that the operator is left with just a single degree of freedom to control the turbine: i.e. regulating the fuel rate. This feature makes the operation of the turbo-engine extremely simple since the operator just regulates the fuel intake and the dynamic system self-adjusts to reach the RPMs corresponding to the operation status given by the relationship between the load and the fuel intake.

The use of electric pumps or compressors in the fuel injection system provides for electronic control of the current. Fuel intake into the combustion chamber is controlled both during start-up and normal running. Moving systems are avoided, such as cables, valves, servomechanisms, etc. which, to assure proper operation, require periodic maintenance servicing to avoid drift, in view of that these systems are influenced by vibrations in the entire assembly and are new sources of malfunction. The system of the invention further provides good injection control precision over a broad range. In this manner, use of precision valves with high-quality fuel filters for achieving a like performance is avoided. This system may also stabilize RPMs by means of control logic in terrestrial applications for production of electric power.

Figure 5:
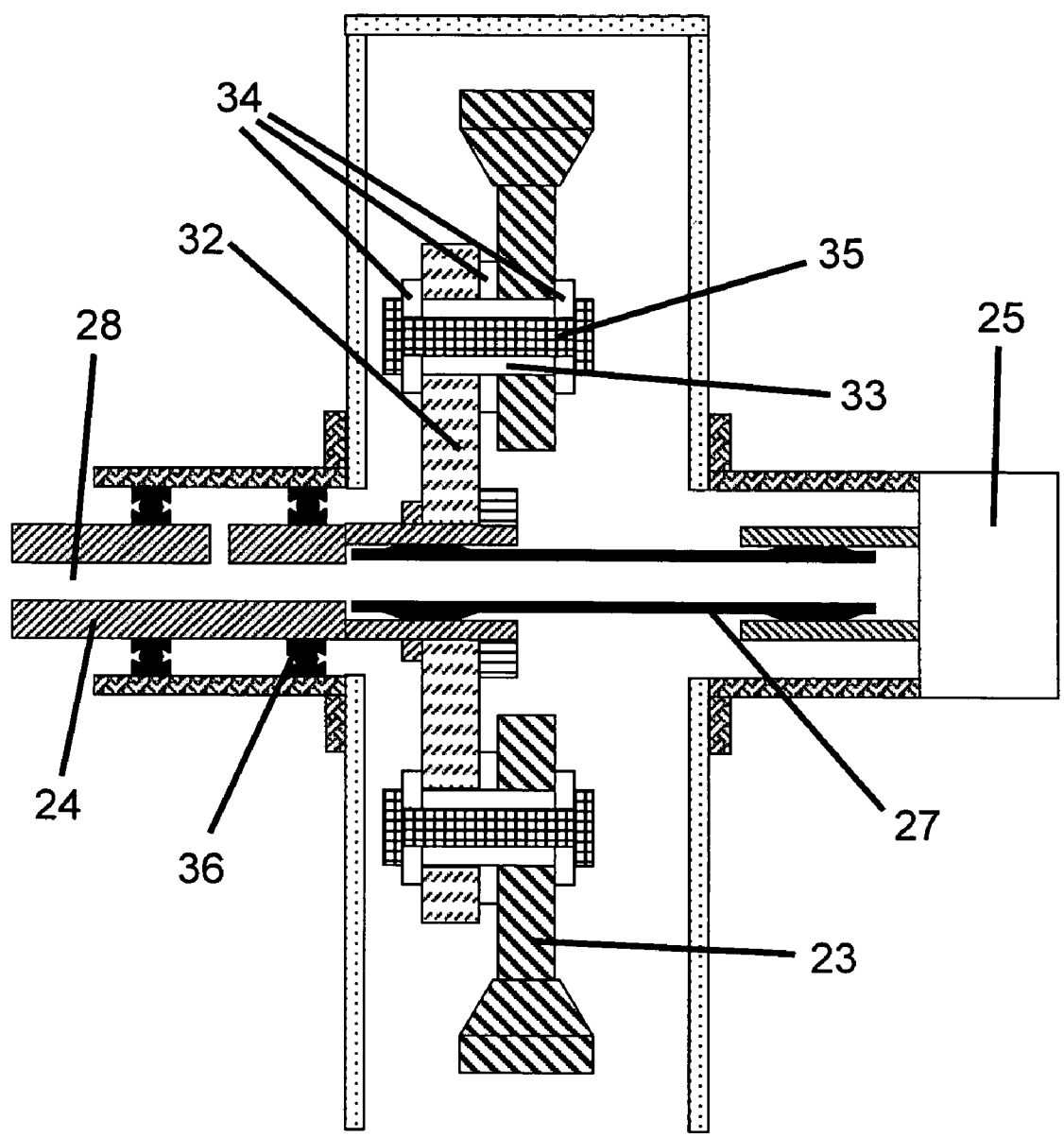
FIG. 5 is a schematic cross-section of the coupling mechanism between the low-speed power transmission shaft and the shift-down gearbox and the coupling to the oil pump.

To prevent wear and decouple vibrations between the load connected to the power output shaft 24 and the gearbox, the embodiment represented in FIG. 5 uses a coupling made of a resistant and resilient material. The coupling mechanism between the power output shaft 24 and the planar gear 23 comprises a disk coupling 32 mounted to the shaft, with orifices in which a resilient bushing having a stop 33, a separator washer 34 between the coupling disk and the gear and bolts 35 are assembled.

This coupling mechanism prevents metal-to-metal contact between the coupling disk 32 affixed to the transmission of power shaft 24 and the gear 23. The use of bushings and washers of elastic materials blocks the transmission of high frequencies to the power shaft which would otherwise affect the useful lifespan of the bearings 36 and the housings thereof. In this way low-cost alloys may be used for the housings.

The systems described hereinabove reduce the wear and increase the useful lifespan of the oil and filters, reducing maintenance service and providing a compact, high-performance and durable turbo-engine having a dynamic response which is not at the expense of the useful lifespan, and a minimum of auxiliary systems and components.

I claim:

1. A combustion chamber for a high-speed, relatively low-power turbine engine, said combustion chamber comprising:
   a wall dividing said chamber into a hot region and a cold region, said cold region at least partially surrounding said hot region and adapted for receiving a carburetant gas at a pressure,
   primary inlet means for admitting said carburetant gas from said cold region into said hot region and
   means for injecting fuel into said hot region for mixing with said gas therein to produce a mixture which, upon ignition, generates a flame front expanding towards said cold region;
   the improvement whereby said combustion chamber further includes:
   passage means for admitting a secondary flow of relatively cool gas from said cold region into said hot region, said passage means comprising a plurality of orifices circumferentially distributed around said wall at a predetermined distance from said fuel injecting means, said orifices communicating said hot region with said cold region, and
   obstruction members partially surrounding said orifices towards said ignition means for generating a vortex in said secondary gas flow in said hot region for confining penetration of said flame front into said cold region.

2. The combustion chamber of claim 1, wherein said members are substantially semicylindrical.

3. A turbo-engine including:
   a turbine having a high-speed output shaft for delivering useful rotational mechanical power,
   a low-speed output shaft for delivering said useful rotational mechanical power to a load,
   a speed step-down system coupling said shafts to one another in order to transmit said useful rotational mechanical power from said high-speed shaft to said low-speed shaft, said step down system including:
   a high-speed gearwheel coupled to said turbine output shaft and
   a low-speed gearwheel having a metal contact surface coupled to said low-speed output shaft, and
   decoupling means for reducing transmission of vibrations between said shafts;
   wherein said decoupling means includes:
   a disk secured to the low-speed shaft and having a metal contact surface, and resilient bushing means coupling said metal contact surface of the low-speed gear to said metal contact surface of the disk, thereby dampening transmission of vibrations between said metal contact surfaces.

4. A turbine for delivering mechanical work to a rotating, low-speed shaft, the turbine including:
a stage for air admission and compression, the air admission and compression stage comprising:
a high-speed shaft containing a central duct or cavity and an air admission end,
bearings supporting said high-speed shaft proximate to said air admission end so as to define a cantilever shaft portion towards a shaft end opposite said air admission end, and
means for conducting oil for lubricating the bearings through the central duct in the shaft,
a centrifugal compressor and a centripetal turbine arranged next to each other in the central cavity end of said shaft;
a combustion chamber including a fuel injection system, and
an expansion stage for generating mechanical work on the high-speed turbine shaft;
a turning speed step-down system including a low-speed gear having a metal contact surface;
auxiliary systems for lubrication, control, operation or ignition; and
a low-speed power output shaft,
the improvements whereby:
the high-speed shaft has orifices arranged for directing the lubricant in the form of jets directly into the bearings thereby reducing the relative speed of the lubricant jet in the bearing, and
said turbine further including devices for decoupling vibrations between said high-speed shaft and said low-speed power output shaft, said vibrations decoupling devices including:
a disk integrated to the low-speed shaft and having a metal contact surface, and bushing means of a resilient material, said bushing means coupling said metal contact surface of the low-speed gear to said metal contact surface of the low-speed shaft, thereby dampening transmission of vibrations between said metal contact surfaces.

5. A turbine according to claim 4, wherein the decoupling device between the step-down system and the high-speed shaft comprises a removable hollow spline adapted for absorbing thermal expansion, vibrations, mechanical assembly tolerances between both first and second subsystems, simplifying assembling and disassembling, and conducting the lubricant towards said orifices of the high-speed shaft.

6. A turbine according to claim 4, further including an external oil circulation pump coupled by means of an removable spline to the transmission shaft, thereby simplifying assembling and disassembling said pump and enabling use of the output pressure of the pump as a control variable during the start-up sequence of the turbine.

7. A turbine according to claim 4, further including:
a positive-displacement pump for circulating oil to the step-down system and the bearings and
control logic means for controlling fuel injection and the related turning speed of the turbine by measuring the output pressure of the lubricant circulation pump.

8. A turbine according to claim 4, wherein said combustion chamber includes a hot region, a cold region, a wall confining the hot region and means located on the outer face of the hot region confining wall for promoting turbulence in the hot region in order to confine and control the flame stability in response to power variation transients of the power output shaft, heating air injected therein and cooling the walls of the chamber.

9. A turbine according to claim 4, further including a channel communicating both sides of the high-speed bearing proximate to the step-down system for draining lubricant after passage thereof by the bearing nearest to the compressor.

10. A turbine according to claim 4, wherein said step-down system is housed in a body which further contains a lubricant reservoir, wherein lubricant conveyed from the high-speed bearings is cooled by mixing with the rest of the lubricant stored in the reservoir, said reservoir further including means for dissipating heat through the walls of the step-down system to the surrounding environment.

11. A turbine according to claim 10, wherein said combustion chamber has:
a compact, toroidal shape, such that the distance traveled by the air inside the chamber is longer than the main length of the chamber,
injectors comprising tubes having no output area contraction to avoid obstruction thereof, said tubes extending in a countercurrent direction for favoring mixing of the fuel with the air or gas, and
means for using the heat of the combustion for assisting in vaporizing the fuel.

12. A turbine according to claim 11 wherein said shift-down system includes one or more gears mounted on a hollow shaft having radial orifices extending from the center to the base of the gear cogs, whereby centrifugal force urges the lubricant to be conducted from the inside out to a cog contact zone, generating a lubrication film oiling, cooling or dampening contact between engaging cogs of two gears.

13. A turbine according to claim 12, including means for starting the turbine under no or negligible external load and thereafter gradually picking up speed until the nominal turning speed is reached.

14. A turbine according to claim 13, wherein said step-down system comprises a gearbox comprising planar or small-angle gearwheels on parallel shafts integrating an auxiliary starter motor for the turbine and an outlet for auxiliary systems.

15. A turbine according to claim 14, wherein said fuel injection system includes at least one injection control valve and an alternative passage having a calibrated cross-section for conducting fuel bypassing the injection control valve, thereby assuring that a minimum flow of fuel is injected for normal running of the turbine, even when the injection control valve is fully closed, and reducing sensitivity of the injection control valve.

16. A turbine according to claim 15, wherein said fuel injection system includes an electrical system for injecting fuel into the combustion chamber and manual operator means for controlling the turbine power by varying the electrical current fed to the electrical fuel injection system.

17. A turbine according to claim 4, wherein said compressor includes a wheel mounted on said high-speed shaft and one or more of said bearings is located within said compressor wheel to minimize mechanical stress on the cantilever shaft portion.

* * * * *